US012562120B2

United States Patent

(12) United States Patent
Jeong et al.

(10) Patent No.: US 12,562,120 B2
(45) Date of Patent: Feb. 24, 2026

(54) PIXEL AND DISPLAY DEVICE

(71) Applicant: Samsung Display Co., Ltd., Yongin-Si (KR)

(72) Inventors: Keuk-Jin Jeong, Yongin-si (KR); Min Kang, Yongin-si (KR); Wongyun Kim, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/932,617

(22) Filed: Oct. 31, 2024

(65) Prior Publication Data

US 2025/0218370 A1 Jul. 3, 2025

(30) Foreign Application Priority Data

Jan. 3, 2024 (KR) ........................ 10-2024-0000714

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2300/0465* (2013.01); *G09G 2300/0819* (2013.01); *G09G 2300/0852* (2013.01); *G09G 2310/08* (2013.01); *G09G 2330/00* (2013.01)

(58) Field of Classification Search
CPC ................... G09G 3/3233; G09G 3/32; G09G 2300/0465; G09G 2300/0819; G09G 2300/0852; G09G 2310/08; G09G 2330/00; G09G 5/10
USPC .......................................................... 345/212
See application file for complete search history.

(56) References Cited

U.S. PATENT DOCUMENTS

| | | | | |
|---|---|---|---|---|
| 10,176,759 | B2 | 1/2019 | Chen et al. | |
| 10,223,971 | B2 | 3/2019 | Chen | |
| 11,562,700 | B2 | 1/2023 | Lee et al. | |
| 11,610,538 | B2 | 3/2023 | Park et al. | |
| 2012/0013597 | A1* | 1/2012 | Han | G09G 3/3233 345/212 |
| 2022/0366852 | A1* | 11/2022 | Jeong | G09G 5/10 |

FOREIGN PATENT DOCUMENTS

| | | | |
|---|---|---|---|
| KR | 10-2176454 | B1 | 11/2020 |
| KR | 10-2258252 | B1 | 5/2021 |
| KR | 10-2022-0074394 | A | 6/2022 |
| KR | 10-2022-0119239 | A | 8/2022 |

* cited by examiner

*Primary Examiner* — Abdul-Samad A Adediran
(74) *Attorney, Agent, or Firm* — Innovation Counsel LLP

(57) ABSTRACT

Disclosed is a pixel including a first transistor including a gate electrode connected to a first node, a first electrode electrically connected to a first power source line, and a second electrode connected to a second node, a second transistor including a gate electrode to which a first scan signal is provided, a first electrode electrically connected to a data line to which a data signal is provided, and a second electrode, a third transistor including a gate electrode, a first electrode connected to a third node, and a second electrode, a first capacitor, and a light emitting element.

20 Claims, 7 Drawing Sheets

PIXEL AND DISPLAY DEVICE

CROSS-REFERENCE TO RELATED APPLICATIONS

This application claims priority under 35 U.S.C. § 119 to Korean Patent Application No. 10-2024-0000714 filed on Jan. 3, 2024, in the Korean Intellectual Property Office, the disclosures of which are incorporated by reference herein in their entireties.

BACKGROUND

Embodiments of the present disclosure described herein relate to a pixel with a reduced area of a pixel driving circuit and a display device including the same.

A display device may be a device which includes various electronic parts such as a display panel displaying an image, an input sensor sensing an external input, and an electronic module. The electronic parts may be electrically connected to each other by signal lines thus variously arranged. The display panel includes a plurality of pixels. Each of the plurality of pixels includes a light emitting element that generates light, and a pixel driving circuit that controls the amount of current flowing through the light emitting element.

SUMMARY

Embodiments of the present disclosure provide a pixel with a reduced area of a pixel driving circuit and a display device including the same.

According to an embodiment, a pixel includes a first transistor including a gate electrode connected to a first node, a first electrode electrically connected to a first power source line to which a first power source is provided, and a second electrode connected to a second node, a second transistor including a gate electrode to which a first scan signal is provided, a first electrode electrically connected to a data line to which a data signal is provided, and a second electrode, a third transistor including a gate electrode to which the first scan signal is provided, a first electrode connected to a third node, and a second electrode connected to the first node, a first capacitor connected between the second electrode of the second transistor and the third node, and a light emitting element including a first electrode and a second electrode electrically connected to a second power source line to which a second power source having a level different from a level of the first power source is provided.

The pixel may further include a fourth transistor including a gate electrode to which a first emission control signal is provided, a first electrode connected to the first electrode of the light emitting element, and a second electrode connected to the second node.

The pixel may further include a fifth transistor includes a gate electrode to which a second scan signal is provided, a first electrode connected to a voltage line to which an initialization voltage is provided, and a second electrode connected to the third node.

The pixel may further include a sixth transistor including a gate electrode to which a second emission control signal is provided, a first electrode connected to the first power source line, and a second electrode connected to the first electrode of the first transistor.

The pixel may further include a second capacitor connected between the first power source line and the first node.

During a first period, the first scan signal and the second scan signal may be activated, and during the first period, the initialization voltage may be provided to each of the first node, the second node, and the third node.

During a second period which follows the first period, the first scan signal and the second emission control signal may be activated, and during the second period, a voltage value obtained by subtracting a threshold voltage of the first transistor from the first power source may be provided to the first node.

During the third period which follows the second period, the first scan signal may be activated, and during the third period, the data signal may be provided to the first node and the third node.

During a fourth period which follows the third period, the second scan signal and the first emission control signal may be activated, and during the fourth period, the initialization voltage may be provided to the first electrode of the light emitting element.

During a fifth period which follows the fourth period, the first emission control signal and the second emission control signal may be activated.

Capacitance of the first capacitor may be smaller than capacitance of the second capacitor.

The second emission control signal may be a signal obtained by shifting a second scan signal of a previous frame period by a predetermined time.

According to an embodiment, a display device includes a display panel including a plurality of pixels. Each of the plurality of pixels includes a light emitting element and a pixel driving circuit electrically connected to the light emitting element. The pixel driving circuit includes a first transistor electrically connected between the light emitting element and a first power source line to which a first power source is provided, and including a gate electrode connected to a first node, a second transistor electrically connected between the first node and a data line, to which a data signal is provided, and including a gate electrode to which a first scan signal is provided, a third transistor electrically connected between the first node and the second transistor and including a gate electrode to which the first scan signal is provided, and a first capacitor connected between the second transistor and the third transistor.

The pixel driving circuit may further include a fourth transistor connected between the light emitting element and the first transistor, and including a gate electrode to which a first emission control signal is provided.

The pixel driving circuit may further include a fifth transistor connected between the third transistor and a voltage line to which an initialization voltage is provided, and including a gate electrode to which a second scan signal is provided.

The pixel driving circuit may further include a sixth transistor connected between the first power source line and the first transistor, and including a gate electrode to which a second emission control signal is provided.

The pixel driving circuit may further include a second capacitor connected between the first power source line and the first node.

Capacitance of the first capacitor may be smaller than capacitance of the second capacitor.

The second emission control signal may be a signal obtained by shifting a second scan signal of a previously frame period by a predetermined time.

The light emitting element may be connected to the fourth transistor.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
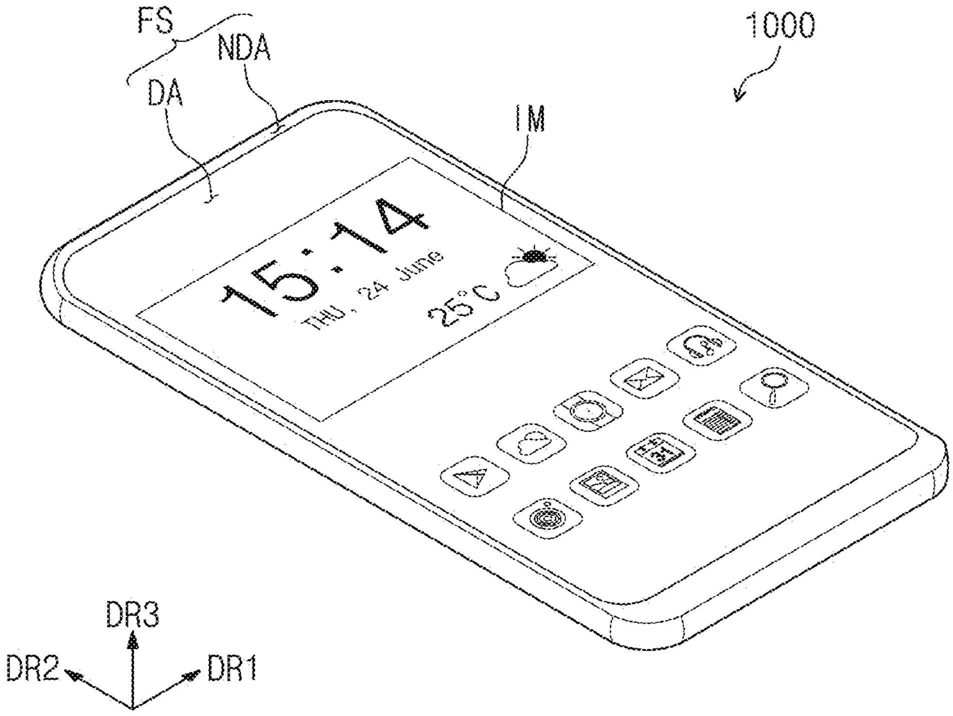
FIG. 1 is a perspective view of a display device, according to an embodiment of the present disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents. The term "and/or" includes one or more combinations in each of which associated elements are defined.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a perspective view of a display device, according to an embodiment of the present disclosure.

Referring to FIG. 1, a display device 1000 may be a device activated depending on an electrical signal. The display device 1000 may include various embodiments. For example, the display device 1000 may include tablets, laptops, computers, smart televisions, VR devices, smartphones, etc. These are just presented as only an embodiment. It is obvious that these are capable of being employed in other display devices as long as these do not depart from the concept of the present disclosure.

The display device 1000 may display an image IM on a display surface FS, which is parallel to each of a first direction DR1 and a second direction DR2, in a third direction DR3 crossing the first direction DR1 and the second direction DR2. The display surface FS on which the image IM is displayed may correspond to a front surface of the display device 1000.

The display surface FS of the display device 1000 may include a plurality of areas. A display area DA and a non-display area NDA may be defined in the display surface FS of the display device 1000.

The display area DA may be an area where the image IM is displayed, and a user may visually perceive the image IM through the display area DA. A shape of the display area DA may be defined substantially by the non-display area NDA. However, this is illustrated as an example. The non-display area NDA may be positioned to be adjacent to only one side of the display area DA or may be omitted. The display device 1000 according to an embodiment of the present disclosure may include various embodiments and is not limited to an embodiment.

The non-display area NDA may be an area disposed adjacent to the display area DA, and may be an area in which the image IM is not displayed. The bezel area of the display device 1000 may be defined by the non-display area NDA.

The non-display area NDA may surround the display area DA. However, an embodiment is not limited thereto. For example, the non-display area NDA may be disposed adjacent to only one edge of the display area DA and is not limited to an embodiment.

Figure 2:
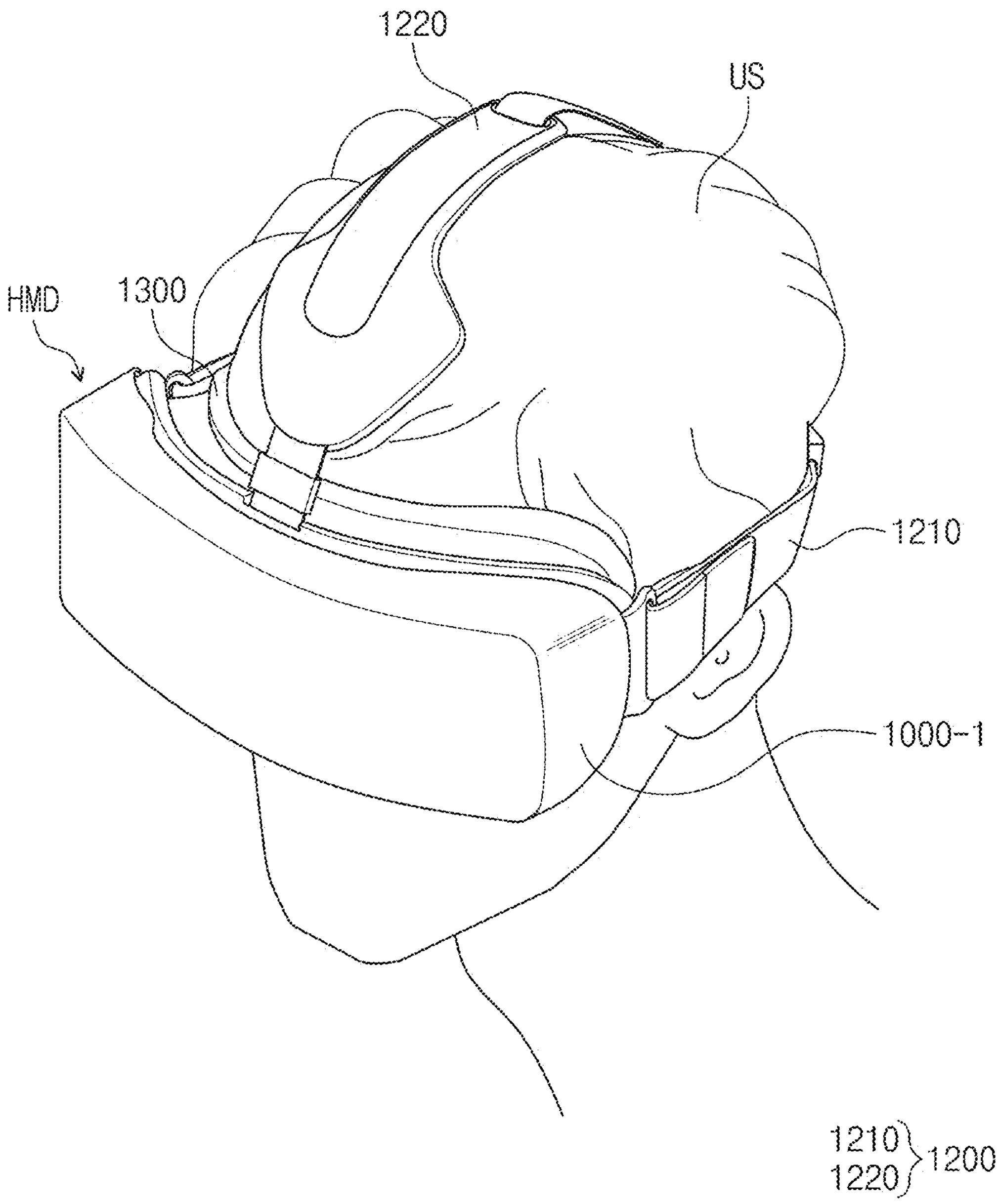
FIG. 2 is a perspective view showing a user wearing a display device according to an embodiment of the present disclosure.

FIG. 2 is a perspective view showing a user wearing a display device, according to an embodiment of the present disclosure.

Referring to FIG. 2, a display device 1000-1 may be provided to a user US in various forms. For example, the display device 1000-1 may be implemented as a wearable device to provide the image IM (see FIG. 1) to a user US. For example, the display device 1000-1 may have a form of a head mounted display HMD worn on the head of the user US, or a form of a glasses-type display device such as glasses which is worn on the user US.

The head mounted display HMD may include the display device 1000-1, a wearing part 1200, and a cushion part 1300.

The display device 1000-1 may cover the eyes of the user US to correspond to left and right eyes of the user US.

The wearing part 1200 may be coupled with the display device 1000-1 such that the display device 1000-1 is capable of being easily worn by the user US. FIG. 2 shows the wearing including a main strap 1210 worn around the head of the user US, and an upper strap 1220 connecting the display device 1000-1 and the main strap 1210 along the top of the head.

The main strap 1210 may fix the display device 1000-1 such that the display device 1000-1 is capable of being closely attached to the head of the user US. The upper strap 1220 may prevent the display device 1000-1 from slipping down, and may distribute the load of the display device 1000-1 to improve the comfort of the user US.

FIG. 2 shows that a length of each of the main strap 1210 and the upper strap 1220 is capable of being adjusted, but the configuration of the main strap 1210 and the upper strap 1220 is not limited thereto. For example, a part that adjusts the length of each of the main strap 1210 and the upper strap 1220 may be omitted, and the main strap 1210 and the upper strap 1220 may have a form of an elastic strap.

When the display device 1000-1 is capable of being fixed to the user US, the wearing part 1200 may be transformed into various shapes other than the shape shown in FIG. 2. For example, the upper strap 1220 may be omitted. Furthermore, in an embodiment of the present disclosure, the wearing part 1200 may be modified into various forms, such as a helmet coupled with the display device 1000-1 or a temple of eyeglasses coupled with the display device 1000-1.

The cushion part 1300 may be placed in close contact with a face of the user US when the user US wears the head mounted display HMD. The cushion part 1300 may freely change shape and may absorb shock applied to the head mounted display HMD. For example, the cushion part 1300 may be a polymer resin or foam sponge, and may include polyurethane, polycarbonate, polypropylene, and/or polyethylene. However, the material of the cushion part 1300 is not limited to the example. In the meantime, the cushion part 1300 may be omitted.

Figure 3:
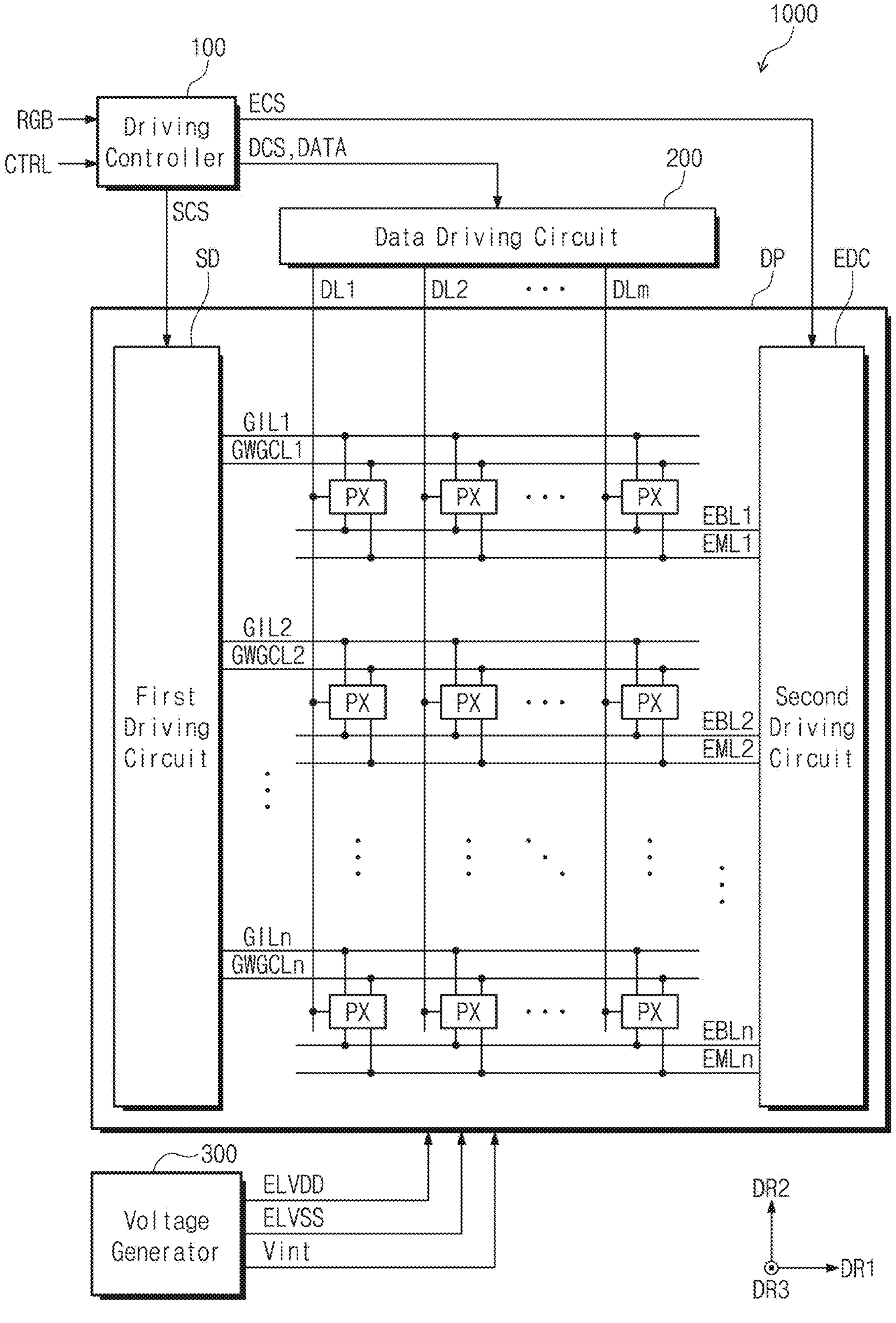
FIG. 3 is a block diagram of a display device according to an embodiment of the present disclosure.

FIG. 3 is a block diagram of a display device, according to an embodiment of the present disclosure.

Referring to FIG. 3, the display device 1000 may include a display panel DP, a driving controller 100, a data driving circuit 200, and a voltage generator 300.

The display panel DP according to an embodiment of the present disclosure may be a light emitting display panel, but is not particularly limited thereto. For example, the display panel DP may be an organic light emitting display panel, a quantum dot light emitting display panel, a micro-LED display panel, or a nano-LED display panel. A light emitting layer of the organic light emitting display panel may include an organic light emitting material. A light emitting layer of the quantum dot light emitting display panel may include a quantum dot, a quantum rod, or the like. A light emitting layer of the micro-LED display panel may include a micro-LED. A light emitting layer of the nano-LED display panel may include a nano-LED.

The driving controller 100 may receive an image signal RGB and a control signal CTRL. The driving controller 100 may generate an image data signal DATA by converting a data format of the image signal RGB to be suitable for the interface specification of the data driving circuit 200. The driving controller 100 may output a scan control signal SCS, a data control signal DCS, and an emission driving control signal ECS.

The data driving circuit 200 may receive the data control signal DCS and the image data signal DATA from the driving controller 100. The data driving circuit 200 may convert the image data signal DATA into data signals Vdata (see FIG. 4) and may output the data signals Vdata (see FIG. 4) to a plurality of data lines DL1 to DLm, respectively. The data signals Vdata (see FIG. 4) may be analog voltages corresponding to grayscale values of the image data signal DATA.

In an embodiment of the present disclosure, during one frame period FP (see FIG. 5), the data driving circuit 200 may output the data signals Vdata (see FIG. 4) corresponding to the image data signal DATA to the data lines DL1 to DLm, respectively.

The voltage generator 300 may generate voltages necessary to operate the display panel DP. In an embodiment of the present disclosure, the voltage generator 300 may generate a first power source ELVDD, a second power source ELVSS, and an initialization voltage Vint. The first power source ELVDD may have a higher voltage level than the second power source ELVSS and the initialization voltage Vint.

The display panel DP may include scan lines GIL1 to GILn and GWGCL1 to GWGCLn, emission control lines EBL1 to EBLn and EML1 to EMLn, data lines DL1 to DLm, and a plurality of pixels PX. The display panel DP may further include a first driving circuit SD and a second driving circuit EDC.

The first driving circuit SD may be arranged on a first side of the display panel DP. The scan lines GIL1 to GILn and GWGCL1 to GWGCLn may extend from the first driving circuit SD in the first direction DR1.

The second driving circuit EDC may be arranged on a second side of the display panel DP. The emission control lines EBL1 to EBLn and EML1 to EMLn may extend from the second driving circuit EDC in a direction opposite to the first direction DR1.

The scan lines GIL1 to GILn and GWGCL1 to GWGCLn and the emission control lines EBL1 to EBLn and EML1 to EMLn may be arranged spaced from each other in the second direction DR2.

The scan lines GIL1 to GILn and GWGCL1 to GWGCLn may include the first scan lines GIL1 to GILn and the second scan lines GWGCL1 to GWGCLn.

The emission control lines EBL1 to EBLn and EML1 to EMLn may include the first emission control line EBL1 to EBLn and the second emission control line EML1 to EMLn.

The data lines DL1 to DLm may extend from the data driving circuit 200 in a direction opposite to the second direction DR2. Each of the data lines DL1 to DLm may be arranged spaced from each other in the first direction DR1.

In the example shown in FIG. 3, the first driving circuit SD and the second driving circuit EDC are arranged to face each other with the pixels PX interposed therebetween, but the present disclosure is not limited thereto. For example, the first driving circuit SD and the second driving circuit EDC may be positioned adjacent to each other on one of the first side and the second side of the display panel DP. In an embodiment, the first driving circuit SD and the second driving circuit EDC may be implemented with one circuit.

The plurality of pixels PX may be electrically connected to the scan lines GIL1 to GILn and GWGCL1 to GWGCLn, the emission control lines EBL1 to EBLn and EML1 to EMLn, and the data lines DL1 to DLm. Each of the plurality of pixels PX may be electrically connected to two scan lines and two emission control lines.

The light emitting element LD (see FIG. 4) of each of the plurality of pixels PX may generate light of different colors. For example, the pixels PX may include red pixels generating red color light, green pixels generating green color light, and blue pixels generating blue color light. A light emitting element of a red pixel, a light emitting element of a green pixel, and a light emitting element of a blue pixel may include light emitting layers of different materials.

The pixel driving circuit may include at least one transistor and at least one capacitor. This will be described later. The first driving circuit SD and the second driving circuit EDC may include transistors formed through the same process as transistors of the pixel driving circuit.

Each of the plurality of pixels PX may receive the first power source ELVDD, the second power source ELVSS, and the initialization voltage Vint from the voltage generator 300.

The first driving circuit SD may receive the scan control signal SCS from the driving controller 100. The first driving circuit SD may output scan signals to the scan lines GIL1 to GILn and GWGCL1 to GWGCLn in response to the scan control signal SCS.

The second driving circuit EDC may output emission signals to emission control lines EBL1 to EBLn and EML1 to EMLn in response to the emission driving control signal ECS from the driving controller 100.

Figure 4:
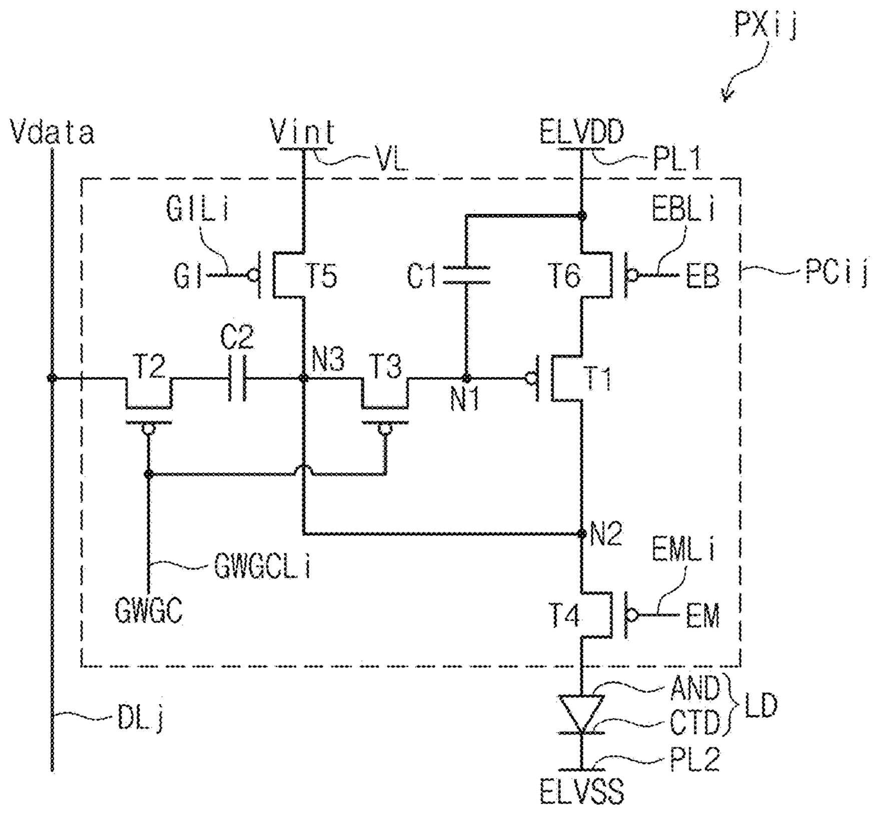
FIG. 4 is an equivalent circuit diagram of a pixel according to an embodiment of the present disclosure.

FIG. 4 is an equivalent circuit diagram of a pixel according to an embodiment of the present disclosure. Each of the plurality of pixels PX shown in FIG. 3 may have the same circuit configuration as the equivalent circuit diagram of the pixel PXij shown in FIG. 4.

Referring to FIGS. 3 and 4, the pixel PXij may be connected to a j-th data line DLj among the data lines DL1 to DLm, an i-th first scan line GILi among the first scan lines GIL1 to GILn, an i-th second scan line GWGCLi among the second scan lines GWGCL1 to GWGCLn, an i-th first emission control line EBLi among the first emission control lines EBLi to EBLn, and an i-th second emission control line EMLi among the second emission control lines EML1 to EMLn. Here, each of ‘i’ and ‘j’ is a natural number.

The pixel PXij may include the light emitting element LD and a pixel driving circuit PCij. The light emitting element LD may be a light emitting diode. For example, the light emitting element LD may be an organic light emitting diode including an organic light emitting layer. The pixel driving circuit PCij may be connected to the light emitting element LD to control the amount of current flowing through the light emitting element LD. The light emitting element LD may generate light having a predetermined luminance depending on the amount of current flowing through the light emitting element LD.

The pixel driving circuit PCij may include first to sixth transistors T1, T2, T3, T4, T5, and T6 and first and second capacitors C1 and C2. The pixel PXij according to an embodiment of the present disclosure may be referred to as a 6T2C structure.

Each of the first to sixth transistors T1 to T6 may be a P-type transistor having a low-temperature polycrystalline silicon (LTPS) semiconductor layer. However, this is an example. For example, the semiconductor layer according to an embodiment of the present disclosure is not limited thereto, and may include an oxide semiconductor, crystalline silicon, or the like. However, this is an example, and all of the first to sixth transistors T1 to T6 according to an embodiment of the present disclosure may be N-type transistors. In an embodiment, at least one of the first to sixth transistors T1 to T6 may be a P-type transistor, and the others thereof may be N-type transistors.

The scan lines GILi and GWGCLi may deliver scan signals GI and GWGC, respectively. The emission control lines EBLi and EMLi may deliver emission control signals EB and EM, respectively. The data line DLj may deliver the data signal Vdata. The data signal Vdata may have a voltage level corresponding to a grayscale value of the image data signal DATA input to the display device 1000.

A first power source line PL1 may provide the first power source ELVDD. A second power source line PL2 may provide the second power source ELVSS. The second power source ELVSS may have a lower voltage level than the first power source ELVDD. A voltage line VL may provide the initialization voltage Vint.

The light emitting element LD may be connected between a fourth transistor T4 and the second power source line PL2 through which the second power source ELVSS is provided. The light emitting element LD may include a first electrode AND and a second electrode CTD. The first electrode AND may be referred to as an anode. The second electrode CTD may be referred to as a cathode. The first electrode AND may be electrically connected to the first power source line PL1 via the fourth transistor T4, the first transistor T1, and the sixth transistor T6. The second electrode CTD may be connected to the second power source line PL2.

When the light emitting element LD is an organic light emitting element, the light emitting element LD may further include an organic layer interposed between the first electrode AND and the second electrode CTD. The first electrode AND of the light emitting element LD may be connected to the pixel driving circuit PCij. The light emitting element LD may emit light according to the amount of the driving current flowing through the first transistor T1 of the pixel driving circuit PCij.

The first transistor T1 may include a gate electrode connected to a first node N1, a first electrode electrically connected to the first power source line PL1 via the sixth transistor T6, and a second electrode connected to a second node N2. The first transistor T1 may be referred to as a driving transistor. The second electrode of the first transistor T1 may be electrically connected to the light emitting element LD via the fourth transistor T4.

The second transistor T2 may include a gate electrode to which a second scan signal GWGC is provided, a first electrode electrically connected to the data line DLj to which the data signal Vdata is provided, and a second electrode connected to the second capacitor C2. The second transistor T2 may be referred to as a “switching transistor”. The gate electrode of the second transistor T2 may be connected to the second scan line GWGCLi. The second transistor T2 may be electrically connected between the data line DLj and the third node N3.

The third transistor T3 may include a gate electrode to which the second scan signal GWGC is provided, a first electrode electrically connected to the third node N3, and a second electrode connected to the first node N1. The third transistor T3 may be connected between the gate electrode of the first transistor T1 and the second transistor T2. The gate electrode of the third transistor T3 may be connected to the second scan line GWGCLi.

The gate electrodes of the second transistor T2 and the third transistor T3 may be connected to the same scan line, for example, the second scan line GWGCLi. The same second scan signal GWGC may be provided to the gate electrode of each of the second transistor T2 and the third transistor T3.

According to an embodiment of the present disclosure, the pixel PXij may be driven by using four signal lines including the first scan line GILi, the second scan line GWGCLi, the first emission control line EMLi, and the second emission control line EBLi. The number of signal lines in the display panel DP (see FIG. 3) may be reduced. Accordingly, the pixel PXij with a reduced area of the pixel driving circuit PCij and the display device 1000 including the same (see FIG. 3) may be provided. Moreover, an interval between wires included in the pixel PXij may increase. Thus, signal interference between the wires may be reduced. Accordingly, the pixel PXij with improved display quality and the display device 1000 (see FIG. 3) including the same may be provided.

Besides, according to an embodiment of the present disclosure, as the number of the first scan line GILi, the second scan line GWGCLi, the first emission control line EMLi, and the second emission control line EBLi decreases, the sizes of the first driving circuit SD and the second driving circuit EDC placed in the non-display area NDA (see FIG. 1) may be reduced. It is possible to provide the display device 1000 (see FIG. 3) with reduced non-display area NDA (see FIG. 1).

However, this is an example, and the types of signals received by the second transistor T2 and the third transistor T3 according to an embodiment of the present disclosure are not limited thereto. For example, the second scan signal GWGC may include a 2-1st scan signal and a 2-2nd scan signal and may be provided to the second transistor T2 and the third transistor T3, respectively.

The fourth transistor T4 may include a gate electrode to which the second emission control signal EM is provided, a first electrode connected to the first electrode AND of the light emitting element LD, and a second electrode connected to the second node N2. The fourth transistor T4 may be connected between the light emitting element LD and the first transistor T1. The gate electrode of the fourth transistor T4 may be connected to the second emission control line EMLi.

The fifth transistor T5 may include a gate electrode to which the first scan signal GI is provided, a first electrode connected to the voltage line VL to which the initialization voltage Vint is provided, and a second electrode connected to the third node N3. The fifth transistor T5 may be connected between the voltage line VL and the third node N3. The gate electrode of the fifth transistor T5 may be connected to the first scan line GILi.

The sixth transistor T6 may include a gate electrode to which a first emission control signal EB is provided, a first electrode connected to the first power source line PL1, and a second electrode connected to the first electrode of the first transistor T1. The gate electrode of the sixth transistor T6 may be connected to the first emission control line EBL1.

The first capacitor C1 may be connected between the first power source line PL1 and the first node N1.

The second capacitor C2 may be connected between the second electrode of the second transistor T2 and the third node N3. The capacitance of the second capacitor C2 may be smaller than the capacitance of the first capacitor C1. Moreover, the physical size of the second capacitor C2 may be smaller than the physical size of the first capacitor C1.

Unlike an embodiment of the present disclosure, the pixel driving circuit of a conventional pixel may include seven or more transistors. The pixel driving circuit of the conventional pixel may include five or more gate control lines for driving the pixel driving circuit. For this reason, the physical area of the pixel driving circuit may increase. As a result, the number of pixels placed per predetermined area becomes relatively small, thereby reducing pixel density. However, according to an embodiment of the present disclosure, the area of the pixel driving circuit PCij may be relatively reduced because the pixel driving circuit PCij includes six transistors T1 to T6 having P-types, three voltage lines PL1, PL2, and VL, four gate control lines GILi, GWGCLi, EBLi, and EMLi, and one the data line DLj. Accordingly, the pixel PXij with a reduced area of the pixel driving circuit PCij and the display device 1000 including the same (see FIG. 3) may be provided. Moreover, the pixel density of the pixel PXij may increase. It may be easy to design high-resolution pixels with a resolution of 4000 pixel per inch (ppi) or more. Accordingly, the pixel PXij with improved display quality and the display device 1000 including the same may be provided.

Furthermore, according to an embodiment of the present disclosure, the power consumption of the display panel DP may be reduced as the number of driving transistors is reduced. Accordingly, the improved pixel PXij designed for low power consumption and the display device 1000 including the same may be provided.

Figure 5:
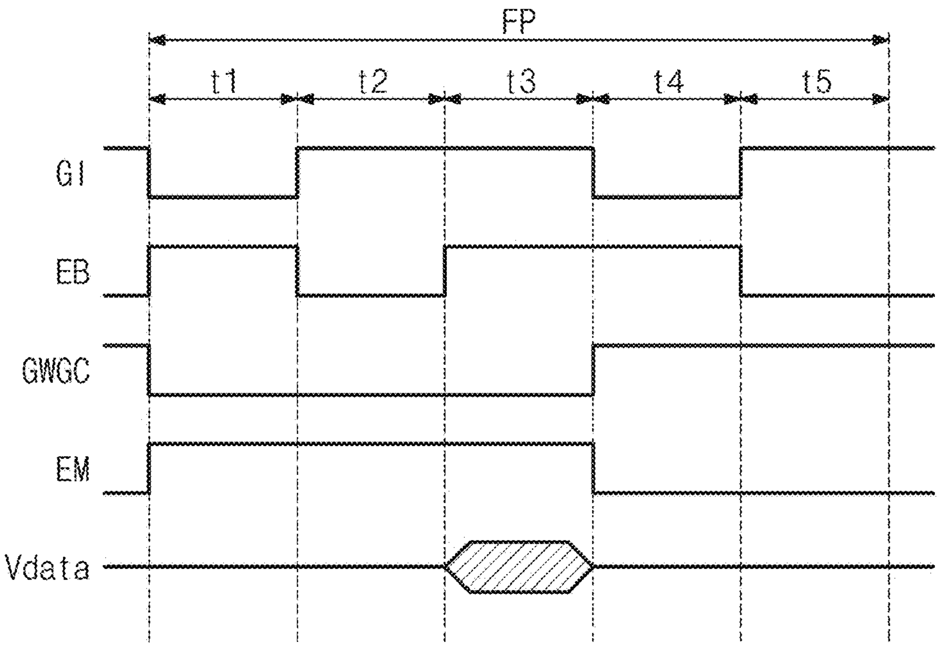
FIG. 5 is a timing diagram for describing an operation of a display device according to an embodiment of the present disclosure.

FIG. 5 is a timing diagram for describing an operation of a display device, according to an embodiment of the present disclosure. FIGS. 6 to 10 are diagrams for describing an operation of a pixel, according to an embodiment of the present disclosure. In the description of FIGS. 6 to 10, the same reference numerals are assigned to the same components described with reference to FIG. 4, and thus the descriptions thereof are omitted to avoid redundancy.

Referring to FIGS. 3 and 5, the display panel DP may display the image IM (see FIG. 1) by operating in units of frame period FP. Any one frame period FP may include first to fifth periods t1, t2, t3, t4, and t5.

The first to fourth periods t1 to t4 may be referred to as non-emission periods. In detail, the first period t1 may be referred to as an "initialization period". The second period t2 may be referred to as a "compensation period". The third period t3 may be referred to as a "data write period". The fourth period t4 may be referred to as an "anode initialization period". The fifth period t5 may be referred to as an "emission period".

Figure 6:
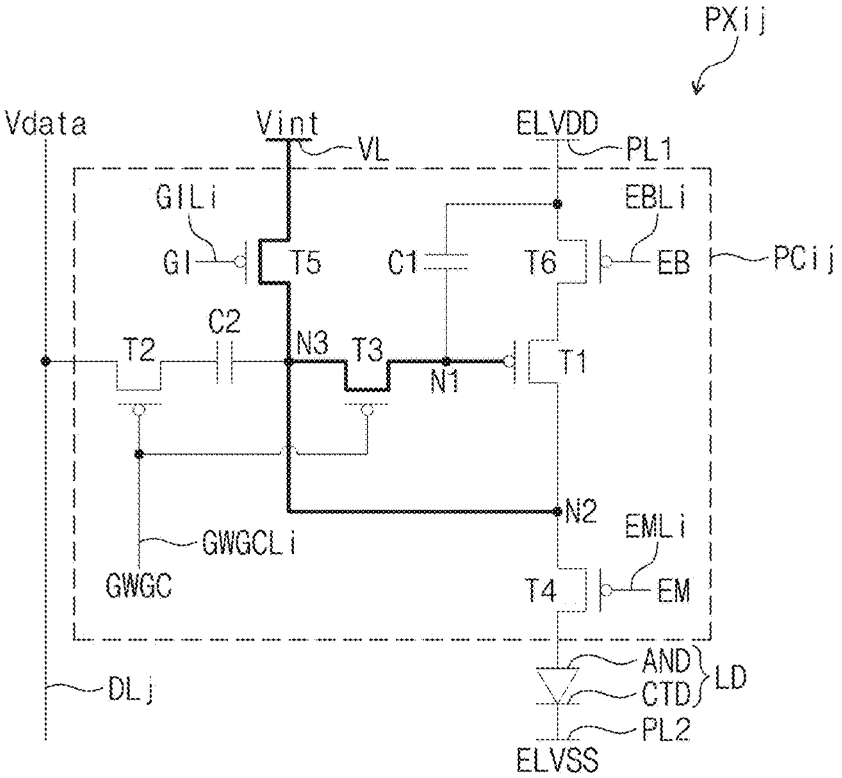
FIGS. 6, 7, 8, 9 and 10 are diagrams for describing an operation of a pixel according to an embodiment of the present disclosure.

FIG. 6 is a diagram for describing an operation of the pixel PXij in the first period t1 of the frame period FP.

Referring to FIGS. 5 and 6, in the first period t1, the first scan signal GI and the second scan signal GWGC may be at active levels. The active level of each of the first scan signal GI and the second scan signal GWGC may be a low level when using the P-type transistors. However, this is an example and the active level of signals according to an embodiment of the present disclosure is not limited thereto. For example, the active levels of signals may be high levels when using N-type transistors.

The first emission control signal EB and the second emission control signal EM may be at an inactive level. The inactive level of each of the first emission control signal EB and the second emission control signal EM may be a high level. However, this is an example. The inactive levels of signals according to an embodiment of the present disclosure are not limited thereto. For example, the inactive levels of signals may be low levels.

The data signal Vdata may have a predetermined voltage level. For example, in the first period t1, the second period t2, the fourth period t4, and the fifth period t5, the data signal Vdata may have a constant DC value. The DC value may be provided to the first electrode of the second capacitor C2. The second electrode of the second capacitor C2 may be connected to the third node N3. The alternating current (AC) component of the data signal Vdata is delivered through the second capacitor C2 to the third node N3, thereby preventing noise from occurring in the third node N3.

The third transistor T3 may be turned on in response to the second scan signal GWGC. The fifth transistor T5 may be turned on in response to the first scan signal GI. The initialization voltage Vint may be provided to the first node N1 via the third transistor T3 and the fifth transistor T5. That is, the gate electrode of the first transistor T1 may be charged to the initialization voltage Vint. The residual current of the first node may be removed.

The initialization voltage Vint may be provided to the second node N2 and the third node N3 through the fifth transistor T5. The second node N2 and the third node N3 may be charged to the initialization voltage Vint. The residual current of the second node N2 and the third node N3 may be removed.

According to an embodiment of the present disclosure, the residual current of the nodes N1, N2, and N3 in a compensation path may be removed before the compensation of a threshold voltage (referred to as Vth) of the first transistor T1 in the second period t2. The pixel PXij may initialize the nodes N1, N2, and N3 in each frame period FP during the first period t1. Defects caused by the residual current may be prevented. In this way, it may be easy to compensate for a threshold voltage of the first transistor T1. Accordingly, the pixel PXij with improved display quality and the display device 1000 (see FIG. 3) including the same may be provided.

Figure 7:
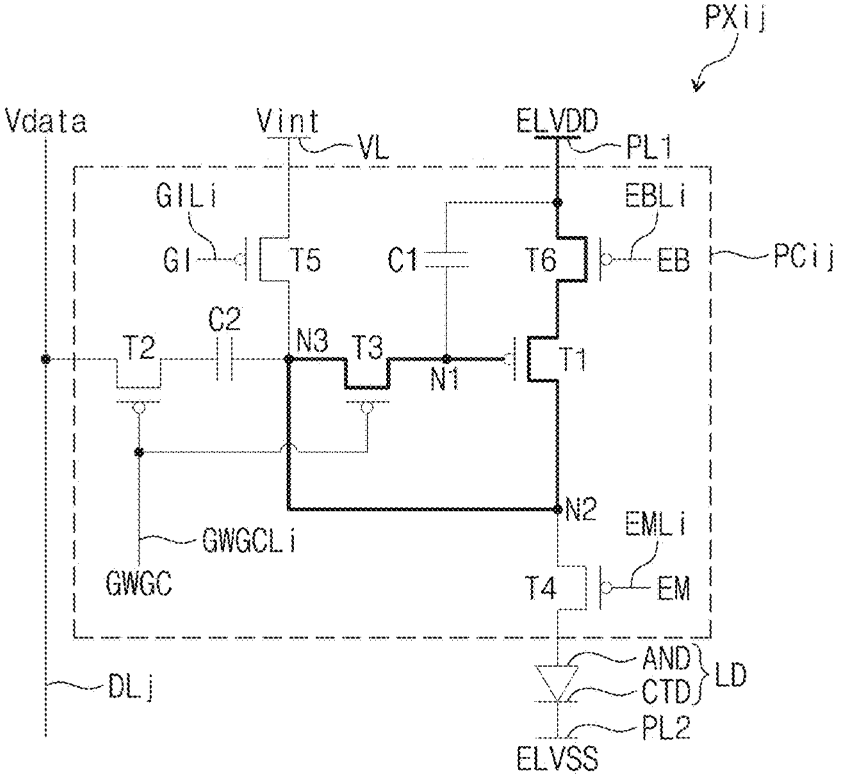

FIG. 7 is a diagram for describing an operation of the pixel PXij in the second period t2 of the frame period FP.

Referring to FIGS. 5 and 7, the second period t2 may follow the first period t1. In the second period t2, the first emission control signal EB and the second scan signal GWGC may be at active levels. The active level of each of the first emission control signal EB and the second scan signal GWGC may be a low level.

The first scan signal GI and the second emission control signal EM may be at inactive levels. The inactive level of each of the first scan signal GI and the second emission control signal EM may be a high level.

The sixth transistor T6 may be turned on in response to the first emission control signal EB. The second transistor T2 and the third transistor T3 may be turned on in response to the second scan signal GWGC.

During the second period t2, the first transistor T1 may operate as a source follower. A voltage lower than the first power source ELVDD by the threshold voltage of the first transistor T1 may be provided to the first node N1. That is, the first node N1 may be charged to a voltage of ELVDD-Vth.

The first capacitor C1 may be placed between the first power source line PL1 and the first node N1. The first capacitor C1 may store the voltage difference between the first power source line PL1 and the first node N1. The first capacitor C1 may be referred to as a storage capacitor.

Figure 8:
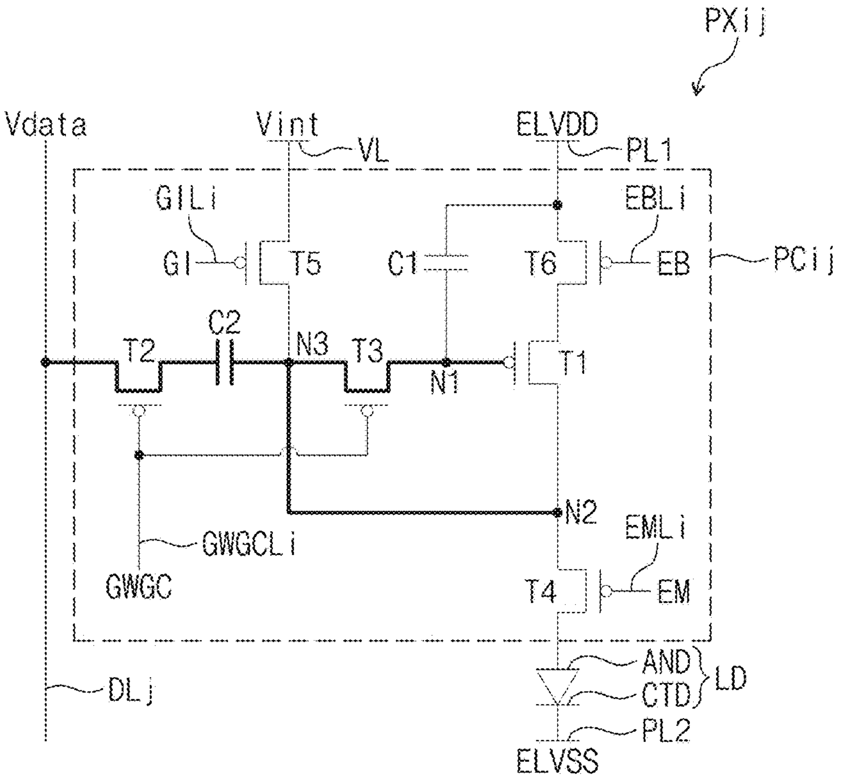

FIG. 8 is a diagram for describing an operation of the pixel PXij in the third period t3 of the frame period FP.

Referring to FIGS. 5 and 8, the third period t3 may be continuous with the second period t2. In the third period t3, the second scan signal GWGC may be at an active level. The active level of the second scan signal GWGC may be a low level.

The first scan signal GI, the first emission control signal EB, and the second emission control signal EM may be at an inactive level. The inactive level of each of the first scan signal GI, the first emission control signal EB, and the second emission control signal EM may be a high level.

The second transistor T2 and the third transistor T3 may be turned on in response to the second scan signal GWGC. The data signal Vdata provided through the data line DLj may be provided to the first electrode of the second capacitor C2. The data signal Vdata may be delivered to the second electrode of the second capacitor C2 in a coupling method and may be provided to the third node N3. The data signal Vdata may be provided to the first node N1 via the third transistor T3.

Figure 9:
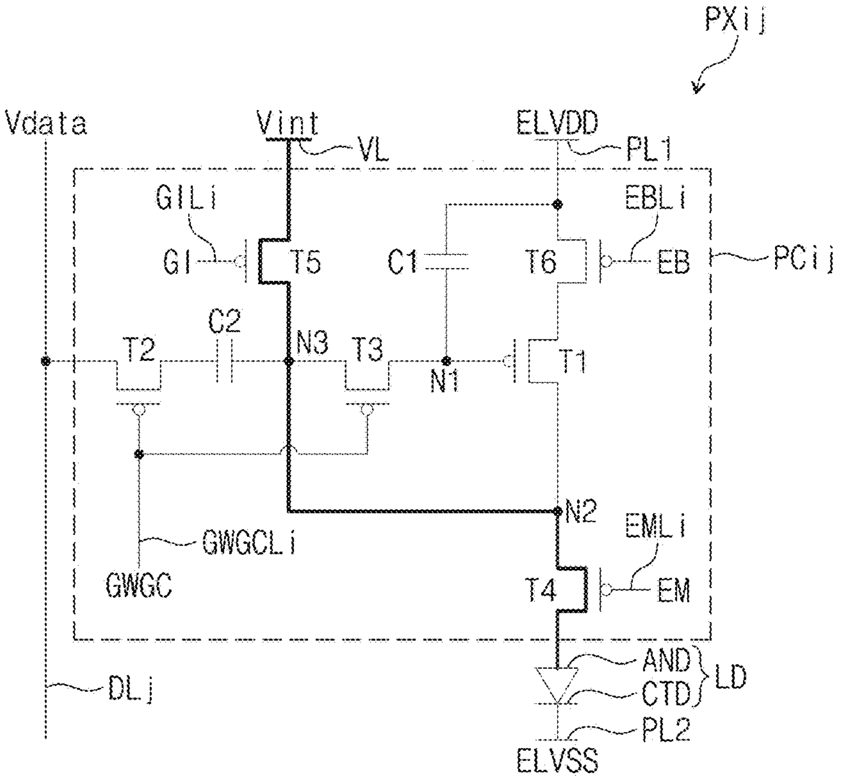

FIG. 9 is a diagram for describing an operation of the pixel PXij in the fourth period t4 of the frame period FP.

Referring to FIGS. 5 and 9, the fourth period t4 may follow the third period t3. In the fourth period t4, the first scan signal GI and the second emission control signal EM may be at active levels. The active level of each of the first scan signal GI and the second emission control signal EM may be a low level.

The second scan signal GWGC and the first emission control signal EB may be at an inactive level. The inactive level of each of the second scan signal GWGC and the first emission control signal EB may be a high level.

The fourth transistor T4 may be turned on in response to the second emission control signal EM. The fifth transistor T5 may be turned on in response to the first scan signal GI. The initialization voltage Vint may be provided to the first electrode AND of the light emitting element LD via the fourth transistor T4 and the fifth transistor T5. The residual current of the first electrode AND of the light emitting element LD may be removed.

According to an embodiment of the present disclosure, the residual current of the anode electrode AND may be removed before an emission operation of the light emitting element LD in the fifth period t5. In other words, the all nodes N1, N2, N3, and AND may be initialized through the first period t1 and the fourth period t4. Defects caused by the residual current of the pixel PXij may be minimized. Accordingly, the pixel PXij with improved display quality and the display device 1000 (see FIG. 3) including the same may be provided.

The sixth transistor T6 may be turned off in response to the first emission control signal EB. The sixth transistor T6 may block the light emission of the light emitting element LD.

Figure 10:
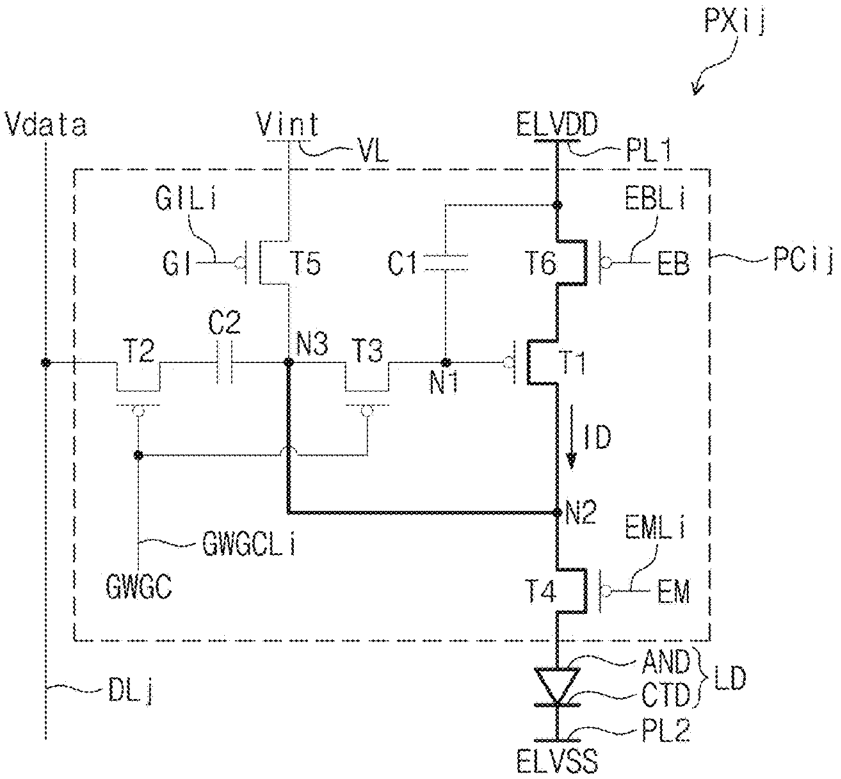

FIG. 10 is a diagram for describing an operation of the pixel PXij in the fifth period t5 of the frame period FP.

Referring to FIGS. 5 and 10, the fifth period t5 may follow the fourth period t4. In the fifth period t5, the first emission control signal EB and the second emission control signal EM may be at active levels. The active level of each of the first emission control signal EB and the second emission control signal EM may be a low level.

The first scan signal GI and the second scan signal GWGC may be at an inactive level. The inactive level of each of the first scan signal GI and the second scan signal GWGC may be a high level.

The fourth transistor T4 may be turned on in response to the second emission control signal EM. The sixth transistor T6 may be turned on in response to the first emission control signal EB.

As the fourth transistor T4 and the sixth transistor T6 are turned on, a driving current ID may flow from the first power source line PL1 through the sixth transistor T6, the first transistor T1, the fourth transistor T4, the light emitting element LD, and the second power source line PL2.

A voltage corresponding to charges stored in the first capacitor C1 may be provided to the gate electrode of the first transistor T1.

The data signal Vdata output from the data driving circuit 200 (see FIG. 3) of the display panel DP (see FIG. 3) may be written in the first capacitor C1. Accordingly, the light emitting element LD may emit light.

The threshold voltage of the first transistor T1 included in each of the plurality of pixels PX (see FIG. 3) may be different depending on characteristics of the first transistor T1. However, according to an embodiment of the present disclosure, the threshold voltage Vth of the first transistor T1 may not affect the driving current ID flowing through the light emitting element LD in the fifth period t5. Accordingly, the luminance of the image IM (see FIG. 1) output from the display panel DP (see FIG. 3) may be maintained uniformly. Accordingly, the pixel PXij with the improved display quality and the display device 1000 (see FIG. 3) including the same may be provided.

The third transistor T3 according to an embodiment of the present disclosure may be placed between the first node N1 and the third node N3 to perform various roles.

In the first period t1, the third transistor T3 may be turned on in response to the second scan signal GWGC. The third transistor T3 may provide a path for electrically connecting the voltage line VL and the first node N1. In other words, the third transistor T3 may provide a path for initializing the gate electrode of the first transistor T1 to the initialization voltage Vint.

In the second period t2, the third transistor T3 may be turned on in response to the second scan signal GWGC. The third transistor T3 may provide a path for electrically connecting the first node N1 to the second node N2 and the third node N3. In other words, the third transistor T3 may provide a path for compensating for the threshold voltage of the first transistor T1.

In the third period t3, the third transistor T3 may be turned on in response to the second scan signal GWGC. The third transistor T3 may provide a path for delivering the data signal Vdata to the gate electrode of the first transistor T1 through coupling of the second capacitor C2.

In the fourth period t4, the third transistor T3 may be turned off in response to the second scan signal GWGC. The third transistor T3 may block the initialization voltage Vint from being provided to the first node N1. For this reason, the data signal Vdata stored in the first capacitor C1 to which the threshold voltage of the first transistor T1 is reflected, may be protected.

In the fifth period t5, the third transistor T3 may be turned off in response to the second scan signal GWGC. The third transistor T3 may block the first power source ELVDD from flowing into the first node N1 through the sixth transistor T6, the first transistor T1 and the third transistor T3.

Figure 11:
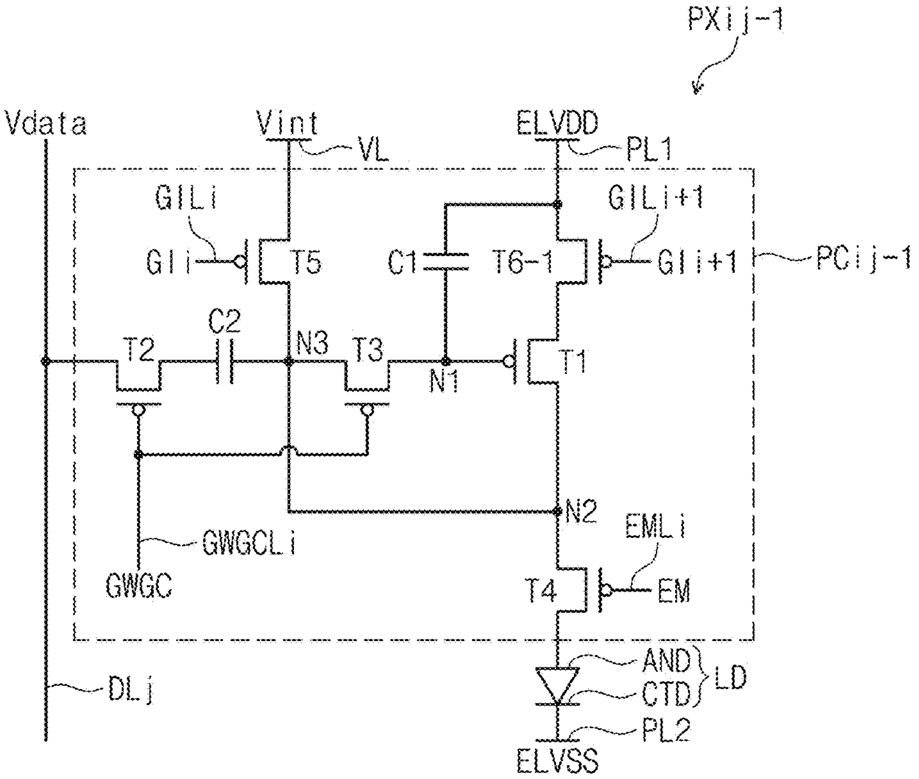
FIG. 11 is an equivalent circuit diagram of a pixel according to an embodiment of the present disclosure.

FIG. 11 is an equivalent circuit diagram of a pixel according to an embodiment of the present disclosure. In the description of FIG. 11, the same reference numerals are assigned to the same components described with reference to FIG. 4, and thus the descriptions thereof are omitted to avoid redundancy.

Referring to FIG. 11, a pixel PXij−1 may include the light emitting element LD and a pixel driving circuit PCij−1.

The pixel driving circuit PCij−1 may include first to sixth transistors T1, T2, T3, T4, T5, and T6-1 and first and second capacitors C1 and C2.

The fifth transistor T5 may include a gate electrode to which the first scan signal GIi is provided, a first electrode connected to the voltage line VL to which the initialization voltage Vint is provided, and a second electrode connected to the third node N3. The fifth transistor T5 may be connected between the voltage line VL and the third node N3. The gate electrode of the fifth transistor T5 may be connected to the first scan line GILi.

The sixth transistor T6-1 may include a gate electrode to which a first scan signal GIi+1 of the next frame period FP (see FIG. 5) is provided, a first electrode connected to the first power source line PL1, and a second electrode connected to the first electrode of the first transistor T1. The gate electrode of the sixth transistor T6 may be connected to the first scan line GILi+1 of the next frame period (see FIG. 5).

In other words, the signal provided to the gate electrode of the sixth transistor T6-1 may be a signal obtained by shifting the second scan signal GIi of a current frame period FP by a predetermined time. In this case, the predetermined time may be a time corresponding to the one frame period FP (see FIG. 5).

Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

As described above, according to an embodiment of the present disclosure, the area of a pixel driving circuit may be relatively reduced because the pixel driving circuit includes less transistors, for example, six transistors having P-types, three voltage lines, four gate control lines, and one data line. Accordingly, a pixel with a reduced area of the pixel driving circuit and a display device including the same may be provided. Moreover, the pixel density of pixels may increase. It may be easy to design high-resolution pixels with a resolution of 4000 pixel per inch (ppi) or more. Accordingly, it is possible to provide pixels with improved display quality and a display device including the same.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A pixel comprising:

a first transistor including a gate electrode connected to a first node, a first electrode electrically connected to a first power source line to which a first power source is provided, and a second electrode connected to a second node;

a second transistor including a gate electrode to which a first scan signal is provided, a first electrode electrically connected to a data line to which a data signal is provided, and a second electrode;

a third transistor including a gate electrode to which the first scan signal is provided, a first electrode connected to a third node, and a second electrode connected to the first node;

a first capacitor connected between the second electrode of the second transistor and the third node; and a light emitting element including a first electrode and a second electrode electrically connected to a second power source line to which a second power source having a level different from a level of the first power source is provided.

2. The pixel of claim 1, further comprising:

a fourth transistor including a gate electrode to which a first emission control signal is provided, a first electrode connected to the first electrode of the light emitting element, and a second electrode connected to the second node.

3. The pixel of claim 2, further comprising:
a fifth transistor includes a gate electrode to which a second scan signal is provided, a first electrode connected to a voltage line to which an initialization voltage is provided, and a second electrode connected to the third node.

4. The pixel of claim 3, further comprising:
a sixth transistor including a gate electrode to which a second emission control signal is provided, a first electrode connected to the first power source line, and a second electrode connected to the first electrode of the first transistor.

5. The pixel of claim 4, further comprising:
a second capacitor connected between the first power source line and the first node.

6. The pixel of claim 5, wherein, during a first period, the first scan signal and the second scan signal are activated, and
wherein, during the first period, the initialization voltage is provided to each of the first node, the second node, and the third node.

7. The pixel of claim 6, wherein, during a second period which follows the first period, the first scan signal and the second emission control signal are activated, and
wherein, during the second period, a voltage value obtained by subtracting a threshold voltage of the first transistor from the first power source is provided to the first node.

8. The pixel of claim 7, wherein, during a third period which follows the second period, the first scan signal is activated, and
wherein, during the third period, the data signal is provided to the first node and the third node.

9. The pixel of claim 8, wherein, during a fourth period which follows the third period, the second scan signal and the first emission control signal are activated, and
wherein, during the fourth period, the initialization voltage is provided to the first electrode of the light emitting element.

10. The pixel of claim 9, wherein, during a fifth period which follows the fourth period, the first emission control signal and the second emission control signal are activated.

11. The pixel of claim 5, wherein capacitance of the first capacitor is smaller than capacitance of the second capacitor.

12. The pixel of claim 5, wherein the second emission control signal is a signal obtained by shifting a second scan signal of a previously frame period by a predetermined time.

13. A display device comprising:
a display panel including a plurality of pixels,
wherein each of the plurality of pixels includes:
a light emitting element; and
a pixel driving circuit electrically connected to the light emitting element, and
wherein the pixel driving circuit includes:
a first transistor electrically connected between the light emitting element and a first power source line to which a first power source is provided, and including a gate electrode connected to a first node;
a second transistor electrically connected between the first node and a data line, to which a data signal is provided, and including a gate electrode to which a first scan signal is provided;
a third transistor electrically connected between the first node and the second transistor and including a gate electrode to which the first scan signal is provided; and
a first capacitor connected between the second transistor and the third transistor.

14. The display device of claim 13, wherein the pixel driving circuit further includes a fourth transistor connected between the light emitting element and the first transistor, and including a gate electrode to which a first emission control signal is provided.

15. The display device of claim 14, wherein the pixel driving circuit further includes a fifth transistor connected between the third transistor and a voltage line to which an initialization voltage is provided, and including a gate electrode to which a second scan signal is provided.

16. The display device of claim 15, wherein the pixel driving circuit further includes a sixth transistor connected between the first power source line and the first transistor, and including a gate electrode to which a second emission control signal is provided.

17. The display device of claim 16, wherein the pixel driving circuit further includes a second capacitor connected between the first power source line and the first node.

18. The display device of claim 17, wherein capacitance of the first capacitor is smaller than capacitance of the second capacitor.

19. The display device of claim 16, wherein the second emission control signal is a signal obtained by shifting a second scan signal of a previously frame period by a predetermined time.

20. The display device of claim 14, wherein the light emitting element is connected to the fourth transistor.

* * * * *